United States Patent
Bosworth et al.

(10) Patent No.: US 9,098,720 B2
(45) Date of Patent: Aug. 4, 2015

(54) LOCATION AWARE SHARED SPACES

(75) Inventors: Andrew Garrod Bosworth, San Mateo, CA (US); David Harry Garcia, Sunnyvale, CA (US); Kenneth M. Lau, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 141 days.

(21) Appl. No.: 13/301,210

(22) Filed: Nov. 21, 2011

(65) Prior Publication Data

US 2013/0132477 A1 May 23, 2013

(51) Int. Cl.
  *G06F 15/16* (2006.01)
  *G06F 21/62* (2013.01)
  *H04L 12/58* (2006.01)
  *G06Q 50/00* (2012.01)

(52) U.S. Cl.
  CPC ............ *G06F 21/6218* (2013.01); *G06Q 50/01* (2013.01); *H04L 51/32* (2013.01); *G06F 2221/2111* (2013.01)

(58) Field of Classification Search
  CPC ................ G06Q 50/01; G06F 21/6218; G06F 2221/2111; H04L 51/32
  See application file for complete search history.

(56) References Cited

U.S. PATENT DOCUMENTS

| | | | |
|---|---|---|---|
| 7,970,418 B2 * | 6/2011 | Schmidt et al. | 455/456.5 |
| 2008/0132251 A1 | 6/2008 | Altman | |
| 2009/0065578 A1 * | 3/2009 | Peterson et al. | 235/382 |
| 2010/0081417 A1 * | 4/2010 | Hickie | 455/414.1 |
| 2010/0120450 A1 | 5/2010 | Herz | |
| 2011/0238755 A1 * | 9/2011 | Khan et al. | 709/204 |
| 2012/0324018 A1 * | 12/2012 | Metcalf et al. | 709/206 |
| 2013/0031489 A1 * | 1/2013 | Gubin et al. | 715/753 |
| 2013/0046879 A1 * | 2/2013 | Garcia et al. | 709/224 |
| 2013/0128038 A1 * | 5/2013 | Cok et al. | 348/143 |

* cited by examiner

*Primary Examiner* — Thomas Dailey
(74) *Attorney, Agent, or Firm* — Baker Botts L.L.P.

(57) ABSTRACT

In one embodiment, a geo-social networking system maintains a data store of shared space, wherein each shared space comprises one or more content objects, a location, and one or more privacy settings. The geo-social networking system allows a user read-access to a shared space based on privacy settings associated with the shared space. The geo-social networking system allows a user write-access to a shared space if the user is at the location associated with the shared space.

17 Claims, 8 Drawing Sheets

LOCATION AWARE SHARED SPACES

TECHNICAL FIELD

The present disclosure generally relates to location-based services, and more particularly, to systems that provide users shared, interactive virtual spaces associated with locations.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to maintaining a data store of shared spaces, wherein each shared space comprises one or more content objects and is associated with a location and one or more privacy settings. In some embodiments, a shared space system manages a user's read-access and write-access to a shared space based on the user's current location and/or privacy settings associated with the shared space. These and other features, aspects, and advantages of the disclosure are described in more detail below in the detailed description and in conjunction with the following figures.

DETAILED DESCRIPTION

Figure 1:
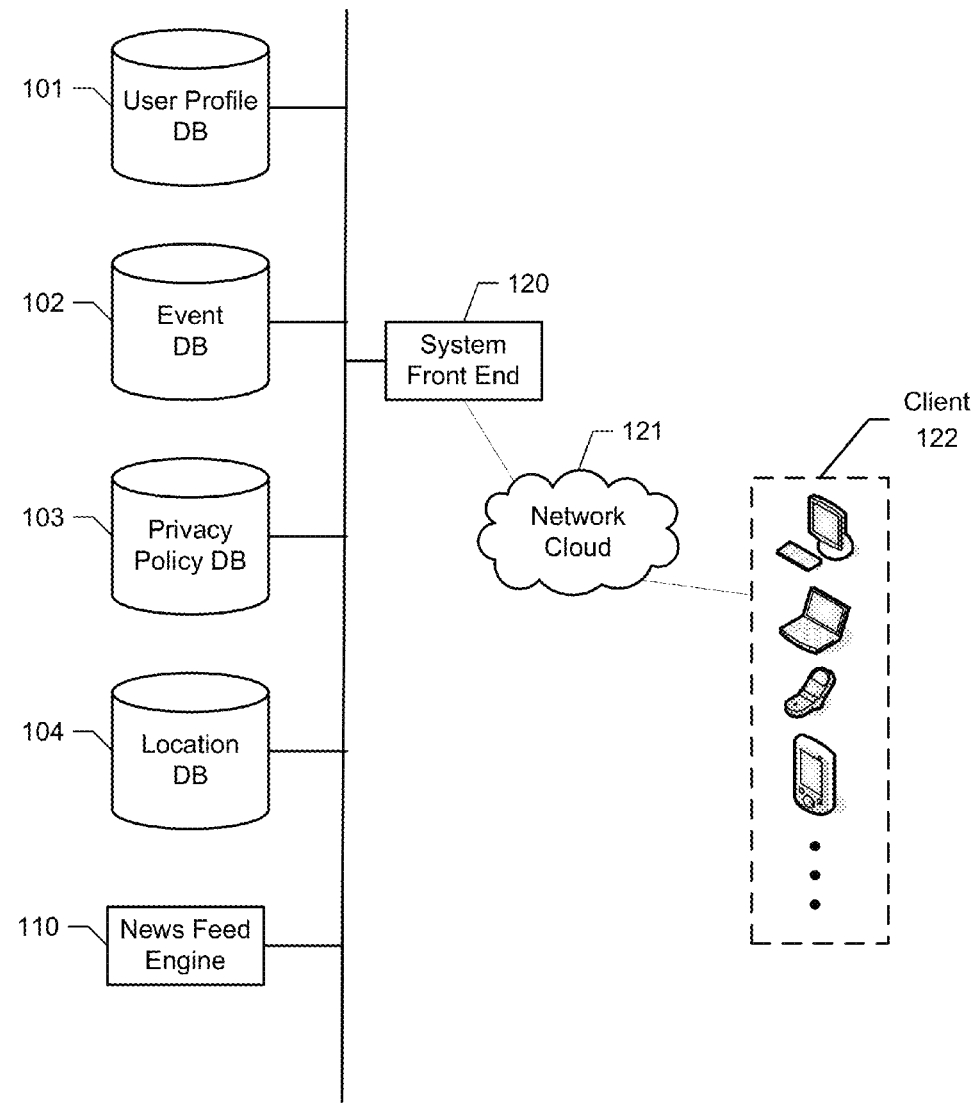
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

The social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042, 357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's location or current trajectory or that are frequented by the user. In one implementation, a user may opt in to this recommendation service, which causes the client application to periodically post location data of the user to the social networking system.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad such as various events related to users within a threshold degree of separation of a subject user, and/or updates to pages that a user has liked or otherwise established a subscriber relationship. Individual users of the social networking system may subscribe to specific news feeds of their interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing an application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120 and news feed engine 110. In particular embodiments, the front end 120 may interact with client device 122 through network cloud 121. For example, the front end 120 may be implemented in software programs hosted by one or more server systems. For example, each database such as user profile database 101 may be stored in one or more storage devices. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet, a corporate intranet, a virtual private network, a local area network, a wireless local area network, a wide area network, a metropolitan area network, or a combination of two or more such networks) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, news feed engine 110 may access user profile database 101, event database 102, and location database 104 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, and location database 104 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

A location-aware service can provide users access to a shared virtual space including one or more content objects (e.g., a post or comment, a photo, a video clip, an application, etc.) that are associated with a particular location. For example, a user with a Google Account can post a photo associated with a particular location to Google Maps service provided by Google, Inc. Another user can access the posted photo in a map incorporating the particular location displayed in a graphical user interface for Google Maps service (e.g., in a web browser window). However, a user that posts (or accesses) a photo associated with a particular location using Google Maps service is not necessarily at or near the particular location while posting (or accessing) the photo. In other instances, location-specific content objects provided by a location-aware service is accessible only to users at a location associated with the content objects. However, the location-specific content objects often can only be modified by an operator or a system administrator of the location-aware service. For example, a museum (e.g., Musée du Louvre) can provide handheld guide devices for visitors. A handheld guide device carried by a user may determine a current location of the user by a location signal specific to a particular exhibit (or a particular room), or by a location key displayed adjacent to a particular exhibit (and entered into the device by the user). The handheld guide device can, based on the current location, provide the user multimedia content (e.g., comments from curators, photos and video clips of related arts) specifically related to an exhibit at the user's current location. However, the location-specific content can only be updated by a system administrator of the museum. A visitor cannot leave a comment about an exhibit at a particular location of the museum while being at the particular location of the museum.

Particular embodiments herein describe methods of maintaining a data store of sets of location-specific virtual spaces associated with content objects, wherein each virtual space is associated with a location and own privacy settings. A user can add to a virtual space of location-specific content objects, only when the user is at the location associated with the set of location-specific content objects. By limiting the circumstances under which a user can add new content objects to a virtual space, particular embodiments can facilitate creation of shared spaces where the content objects are more relevant to an associated location. Meanwhile, read/write-access to a location-specific virtual space may also be limited based on privacy settings associated with the virtual space generally or associated with particular location-specific content objects (e.g., based on social proximity between uploading and viewing users, common interests, etc.). Thus, particular embodiments of the virtual shared space system can provide different content objects to different users at the same location depending on social connections, group membership and/or user interests. Furthermore, particular embodiments can provide to a user content objects that are more relevant to the user (e.g., as the content objects are provided by the user's social contacts).

Figure 2:
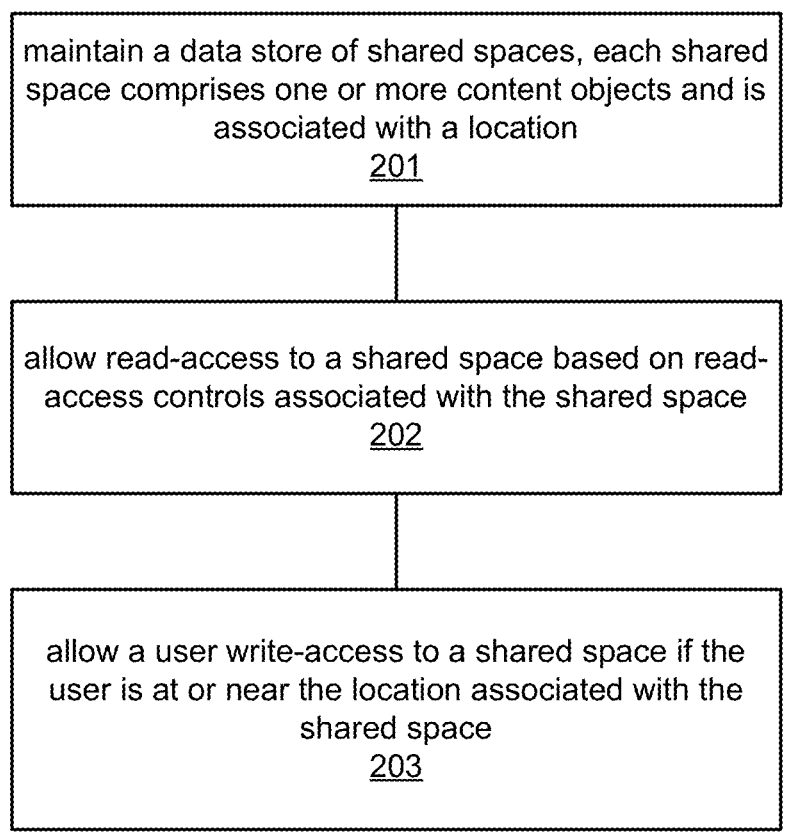
FIG. 2 illustrates an example method of managing location-specific shared spaces.

FIG. 2 illustrates an example method of managing location-specific, shared virtual spaces. The example method of FIG. 2 can be implemented by a location-aware, shared space process hosted by one or more computing devices of the social networking system. In particular embodiments, the location-triggered shared space process may maintain a data store of shared virtual spaces, wherein each shared virtual space comprises one or more content objects and is associated with a location and, optionally, one or more privacy settings (201). The one or more content objects may comprise a photo, a video clip, an audio clip, a text string (e.g., a user comment, a restaurant review), a structured document, an Uniform Resource Locator (URL) link, an application, or any combination of the foregoing. The one or more privacy settings may comprise read-access and/or write-access permissions for the shared space. For example, a shared space can be a collection of photos associated with a geographic location (or region) corresponding to the Golden Gate Bridge north of San Francisco, Calif. Privacy settings associated with the shared space may comprise read-access and write-access being set to allow various users of the social networking system to access the shared virtual space. For example, the shared virtual space may be a public space with read-access to all users. In other implementations, read-access can be limited by group membership or by degrees of separation between a first user that created the virtual space and other users. In some implementations, read access can be limited based on degrees of separation between the user that created or initiated the shared virtual space, as well as those users that commented or added to the shared virtual space. In one implementation, a shared space can be maintained as a hub node in a social graph or other data structure maintained by the social networking system, as described in U.S. patent application Ser. No. 12/763,171.

A user of the social networking system may create a shared virtual space associated with the user's current location. In particular embodiments, a creating user of a shared space may transmit to the social networking system a request for creating a shared space. The request may comprise or identify one or more content objects. As part of the shared space creation process, the creating user may configure one or more privacy settings associated with the shared space. For example, the one or more privacy settings may be based on social proximity (e.g., access being limited to the creating user's first-degree contacts, access being limited to users who are within two degrees of separation from the creating user, access being for all users of the social networking system), social factors such as common interest (e.g., users who went to the same college as the creating user, users who like a place page of a sports team), and/or individually. For example, a user may access a special-purpose client application hosted by the user's GPS-equipped mobile device, select one or more content objects (e.g., a photo, a video clip) stored in the mobile device, enters a name for a shared space, and select privacy settings (e.g., read-access for the user's first-degree contact, and write-access being limited to the user only), causing the special-purpose client application to transmit to the social networking system a request for creating a shared space, the request including an user identifier of the user, the name of the shared space, the one or more content objects, and the privacy settings. For example, in response to a user's checking in to a place, a server-side process may construct a place web page including a selectable icon for creating a shared space (e.g., "Create your own shared space here."), and present the place web page in a graphical user interface of an application hosted by the user's computing device. The user may select the selectable icon, and select one or more content objects (e.g., a set of photos) stored in the user's computing device and one or more privacy settings, causing the application to transmit to the social networking system a request for creating a shared space, including the user's identifier for the social networking system, the one or more content objects, and the one or more privacy settings. In response to the creating user's request, the location-triggered shared space process may access location database 104 for a current location of the creating user (e.g., recorded GPS coordinates, a recent place check-in activity), and store the shared space including the creating user's current location, the one or more content objects, and the privacy setting in location database 104. In other embodiments, the social networking system may automatically created a shared space from posting requests (e.g., photo upload, status update, etc.) from a plurality of users based on social, spatial, and temporal proximity, as described in U.S. patent application Ser. No. 13/229,241, which is incorporated in reference herein in its entirety for all purposes.

In one embodiment, the location-triggered shared space process may authenticate a creating user's current location. For example, the location-triggered shared space may transmit a message to a creating user's mobile device, causing an application hosted by the mobile device to obtain location information of the mobile device (e.g., an IP address of an access point for the mobile device's network connection, one or more identifiers of cell towers that the mobile device is maintaining communication with, GPS coordinates of the mobile device) and transmitting the location information of the creating user's mobile device to the social networking system. The location-triggered shared space process can access one or more data stores of location information (e.g., location information for public wireless hot spots, location information for cell towers) and verify the location information of the creating user's mobile device. For example, the location-triggered shared space process may transmit a request for location authentication to a creating user's mobile device, causing an application to present (in its graphical user interface) to the creating user a request to provide information for the creating user' current location (e.g., take a picture of a QR code nearby, take a picture of a landmark nearby, tap the mobile device near a Near Field Communication or NFC device or reader with a know location if the mobile device is NFC enabled). The creating user may provide location information as requested (e.g., the creating user can take a picture of a landmark nearby using the mobile device), causing the application to transmit the location information to the social networking system. The location-triggered shared space process can access one or more data stores of location information (e.g., a data store of photos and respective locations for the photos) and verify the location information provided by the creating user.

As described above, a creating user of a shared space can specify users who can read and/or write to the shared space based on one or more privacy settings associated with the shared space. For example, a user can create a shared space with a location at a popular destination (e.g., "Golden Gate Bridge") with photos that the user had just taken at the location. Instead of having the photos being viewed by all users of the social networking system, the user can specify in the one or more privacy settings that limit read/write-access of the shared space "Golden Gate Bridge" to the user's first-degree friends. For example, the user can specify in a read access control that limits read access of the shared space "Golden Gate Bridge" to users who are at the location (the Golden Gate Bridge). For example, a system administrator of a sports team (e.g., Oakland Athletics) can create a shared space (e.g., "A's vs. Yankees series, July 2011") with a location corresponding to the sports team's home stadium (e.g., Oakland Coliseum). The system administrator of the sports team can create the shared space as a forum for the team's fans by specifying in the one or more privacy settings that limit read/write-access of the shared space "A's vs. Yankees series, July 2011" to users who like a place web page of the sports team. In one embodiment, the social networking system may specify one or more default privacy settings for a shared space (e.g., read/write-access limited to the creating user's first-degree social contacts).

Figure 2A:
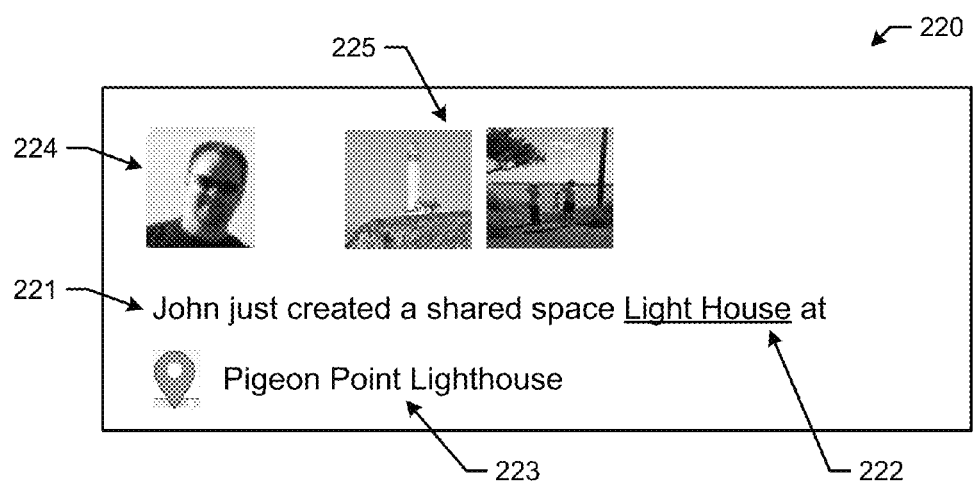
FIG. 2A illustrates an example news feed entry for a newly created shared space.

In some embodiments, the location-triggered shared space process may transmit notifications to one or more users of the social networking system when creating a shared space. For example, the location-triggered shared space process may send a message (e.g. "John just created a share space Light House") via a private communication channel (e.g., an email, an Short Message Service or SMS message), to users with read-access to the newly created shared space specified in the privacy settings associated with the newly created shared space. For example, location-triggered shared space process may cause news feed engine 110 to create a news feed entry including a selectable link to the newly created shares space, and add the news feed entry to news feeds for profile pages of the creating user and users with read-access to the newly created shared space specified in the privacy settings associated with the newly created shared space (i.e., posting the news feed entry to walls of the creating user and users with read-access to the newly created shared space). FIG. 2A illustrates an example news feed entry for a newly created shared space. In the example of FIG. 2A, a news feed entry 220 for a newly created shared space may include a message 221 with a selectable link for the shared space 222 and a location of the shared space 223. The news feed entry may further include a profile picture 224 of the creating user of the shared space, and thumbnails 225 for one or more content objects of the newly created shared space.

Figure 3:
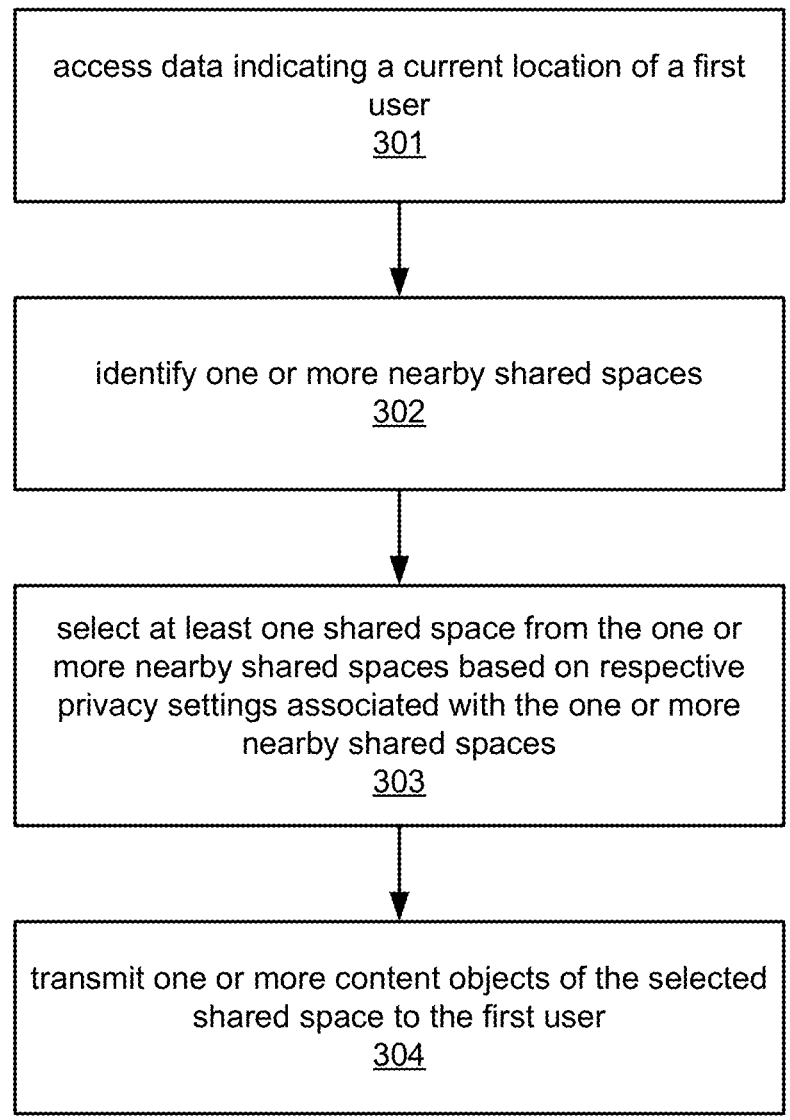
FIG. 3 illustrates an example method of managing read-access for a shared space.

In particular embodiments, the location-triggered shared space process may allow read-access to a shared space based on read-access controls associated with the shared space (202). FIG. 3 illustrates an example method of managing read-access of a shared space and providing one or more content objects of the shared space to a user of the social networking system. In particular embodiments, the location-triggered shared space process may access data indicating a current location of a first user (301). For example, the location-triggered shared space process may access location database 104 for a current location of the first user (e.g., recorded GPS coordinates, a recent place check-in activity). In particular embodiments, the location-triggered shared space process may identify one or more nearby shared spaces (302). For example, the location-triggered shared space process may access location database 104 for one or more nearby shared spaces, wherein each of the one or more nearby shared spaces has a location within a threshold distance (e.g., 200 feet) from the first user's current location. In particular embodiments, the location-triggered shared space process may select at least one shared space from the one or more nearby shared spaces based on respective privacy settings associated with the one or more nearby shared spaces (303). That is, the location-triggered shared space process may select a particular nearby space if one or more privacy settings of the particular nearby shared space allow first user read-access to the particular nearby shared space.

In particular embodiments, after the location-triggered shared space process determines that the first user is at or near a location of the selected shared space and has read-access to the selected shared space, the location-triggered shared space process may transmit one or more content objects (e.g. a photo, a video clip, a comment) of the selected shared space to the first user (304). For example, the location-triggered shared space process can transmit one or more content objects of the selected shared space to the first user's mobile device, causing the one or more content objects to be displayed in a graphical user interface of an application hosted by the first user's mobile device. For example, a first user may check in to a place using a mobile client application hosted by the user's GPS-equipped mobile device. In response to the first user's check-in activity, the location-triggered shared space process may identify one or more shared space near a location corresponding to the place (302), and select from the one or more nearby shared places at least one shared space that allows the first user read-access (303). The location-triggered shared space process may cause a server-side process to construct a place web page incorporating a selectable link of the selected shared space and selectable snippets/thumbnails of one or more content objects of the selected shared space, and present the place web page in a graphical user interface of the mobile client application. The first user can select the link and/or the snippets/thumbnails, causing the mobile client application to retrieve from the social networking system one or more content objects of the selected shared space and display the content objects in its graphical user interface.

The example method of FIG. 3 may enable the social networking system to provide a user one or more content objects that are relevant to the user. For example, a first user may go to a popular destination such as Golden Gate Bridge. Instead of transmitting one or more photos of Golden Gate Bridge taken by any users of the social networking system to the first user's GPS-equipped mobile device, the social networking system can based on the example method of FIG. 3, transmit to the first user one or more photos from a shared space created by the first user's first-degree friend (and with a location corresponding to Golden Gate Bridge). For example, as a fan of Oakland Athletics checks in to a place corresponding to Oakland Coliseum, the social networking system can construct a place web page (corresponding to Oakland Coliseum) including photos and video clips from the shared space "A's vs. Yankees series, July 2011" set up by Oakland Athletics as described earlier, instead of including photos and video clips from another sports team sharing the same home stadium (e.g., Oakland Raiders), or from a music band holding a concert at Oakland Coliseum recently.

In particular embodiments, the location-triggered shared space process may receive, from a first user, a request to access a shared space. For example, a first may access a map application hosted by the first user's GPS-equipped mobile device, causing the map application to transmit to the social networking system GPS coordinates of the first user's current location, and a request for one or more shared spaces near the first user's current location. The location-triggered shared space process may identify one or more shared spaces near the first user's current location (302), and select from the one or more nearby shared spaces at least one shared space that allows first user read-access (303). The location-triggered shared space process may transmit the location and snippets/thumbnails of one or more content objects of the selected shared space to the first user's mobile device, causing the map application to display in its graphical user interface a map including the first user's current location, with the snippets/thumbnails of one or more content objects of the selected shared space overlaying the map. Yet for another example, a first user may select a selectable link of a shared space included in a news feed entry displayed in a graphical user interface of an application hosted by the first user's GPS-equipped mobile device, causing the application transmit to the social networking system the link, the first user's identifier for the social networking system, and the first user's current GPS coordinates. The location-triggered shared space process may determine whether the first user's current GPS coordinates is within a threshold distance (e.g., 200 feet) from a location associated with the shared space, and whether the first user has read-access to the shared space based on one or more privacy settings associated with the shared space. If the first user is at the location associated with the shared space and has read-access to the shared space, the location-triggered shared space process may cause a server-side process to construct a web page corresponding to the shared space with one or more content objects from the shared space, and present the web page in the graphical user interface of the application.

In other embodiments, the location-triggered shared space process may allow read-access to a shared space for a first user when the first user is not near the location of the shared space, while one or more privacy settings of the shared space allow the first user read-access to the shared space. For example, the first user can access a map application hosted by the first user's computing device, and request a map of a particular location different from the first user's current location, causing the map application to transmit to the social networking system a request for content objects specific to the particular location. In response to the first user's request, the location-triggered shared space process may access location database 104 and identify one or more shared spaces that are near the particular location (e.g., within 200 feet radius). The location-triggered shared space process may select, from the one or more shared spaces near the particular location, at least one shared space that allow read-access for the first user based on respective privacy settings associated with the one or more shared spaces near the particular location. The location-triggered shared space process may then transmit one or more content objects of the selected shared space to the first user's computing device, causing the map application to display in its graphical user interface a map including the particular location, with the one or more content objects (or their snippets/thumbnails) overlaying the map.

In one embodiment, the location-triggered shared space process may transmit a message to the creating user of a shared space if another user accesses the shares space. For example, as the location-triggered shared space process transmit content objects of a shared space to a second user (304), the location-triggered shared space process can also transmit a message (e.g., "Wilson just checked out your shared space Light House") to the creating user of the shared space via a private communication channel (e.g., an email message, an SMS message).

Figure 4:
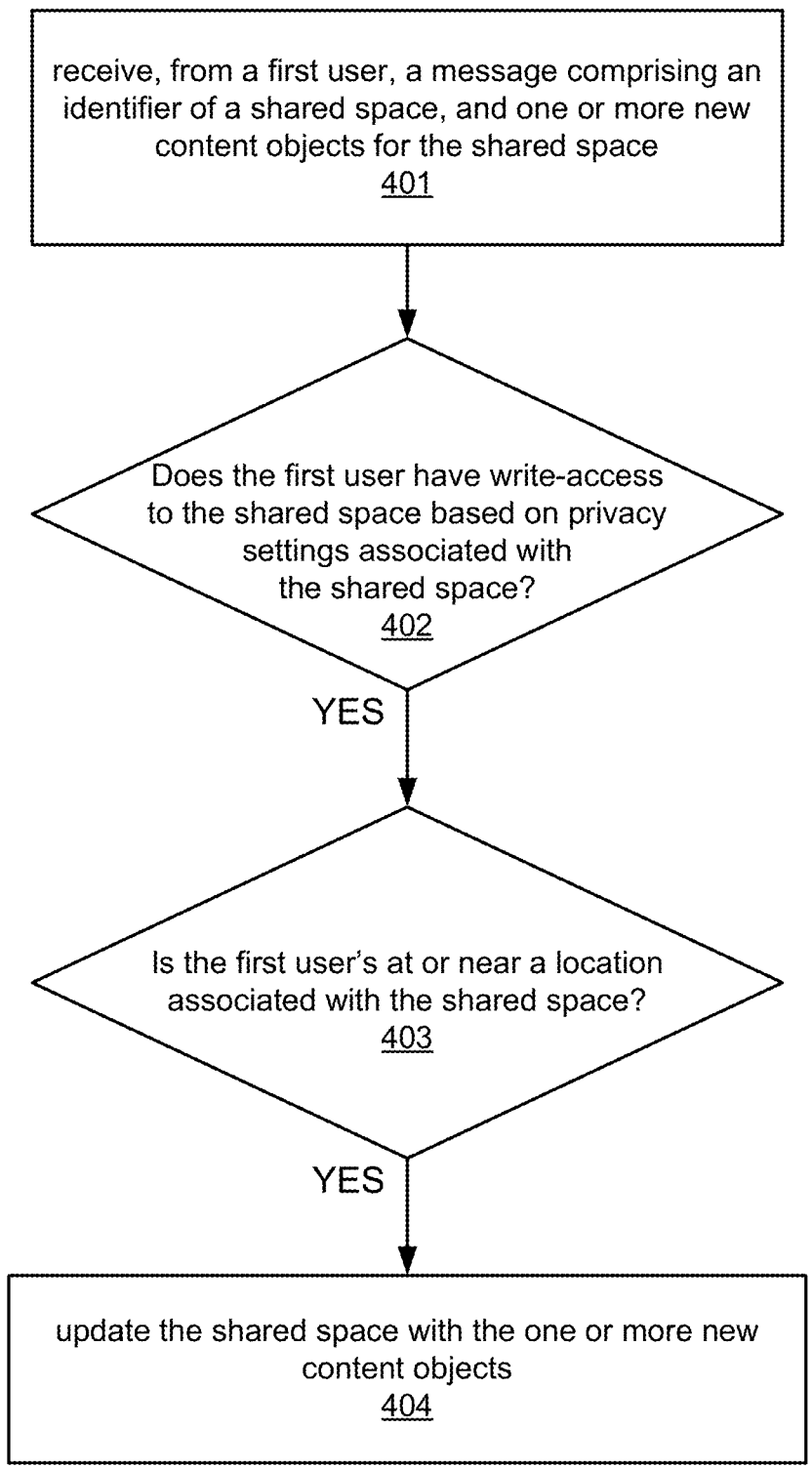
FIG. 4 illustrates an example method of managing write-access to a shared space.

In particular embodiments, the location-triggered shared space process may allow a user write-access to a shared space if the user is at or near the location associated with the shared space (203). FIG. 4 illustrates an example method of managing write-access to a shared space. In particular embodiments, the location-triggered shared space process may receive, from a first user, a message comprising an identifier of a shared space, and one or more new content objects for the shared space (401). For example, a first user can select a shared space from a place web page presented by a mobile client application hosted by the first user's GPS-equipped mobile device as described earlier, and select a set of photos stored in the mobile device, causing the mobile client application to transmit to the social networking system a message for adding the set of photos to the selected shared space. For example, a first user can access a web page of a shared space in a graphical user interface of an application hosted by the first user's computing device, and enter a comment in a dialog box in the web page (e.g., "Post your comment here:"), causing the application to transmit to the social networking system a message for adding the comment to the shared space. In particular embodiments, the location-triggered shared space process may access location database 104 for the first user's current location data (e.g., based on location check-in activity, or recorded GPS coordinates). In one embodiments, the location-triggered shared space process may determine the first user's location based on IP address of an access point of the first user's network connection. Other methods for identifying the location of the first user may include data reports from POS systems or mobile devices of other users that have interacted with the first user's mobile phone via BlueTooth or Near-Field Communications (NFC) protocols. In particular embodiments, the location-triggered shared space process may access location database 104 for a location and one or more privacy settings associated with the shared space. In particular embodiments, the location-triggered shared space process may determine whether the first user have write-access of the shares space based on the one or more privacy settings associated with the shares space (402). In particular embodiments, the location-triggered shares space process may determine whether the first user is at or near the location associated with the shared space (403). For example, the location-triggered shared space process may determine whether the first user's current location is within a threshold distance (e.g., 200 feet) from the location associated with the shared space. In particular embodiments, the location-triggered shared space process may update the shared space stored in location database 104 with the one or more new content objects from the first user, if the first user has write-access to the shared space and the first user is at or near the location associated with the shared space (404).

Figure 4A:
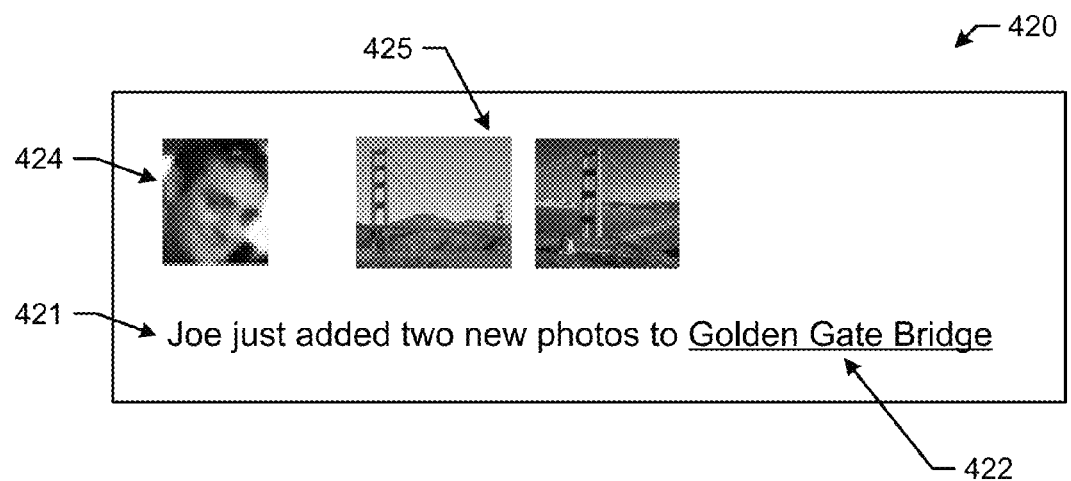
FIG. 4A illustrates an example news feed entry for newly added content objects.

In particular embodiments, the location-triggered shared space process may transmit notifications about newly added content objects to other users with read-access to the shared space. For example, the location-triggered shared space process can transmit a notification (e.g., "Joe just added two new photos to Golden Gate Bridge.") to each of users with read access of the shared space "Golden Gate Bridge." via a private communication channel (e.g., an email, an SMS message). For example, the location-triggered shared space process may cause news feed engine 110 to create a news feed entry for newly added content objects, and add the news feed entry to news feeds for profile pages of the users with read-access to the shared space. FIG. 4A illustrates an example news feed entry for newly added content objects. In the example of FIG. 4A, a news feed entry for newly added content objects 420 may include a message 421 with a selectable link to the shared space 422. The news feed entry 420 may also include a profile picture of the first user 424, and thumbnails of newly added photos 425.

Figure 5:
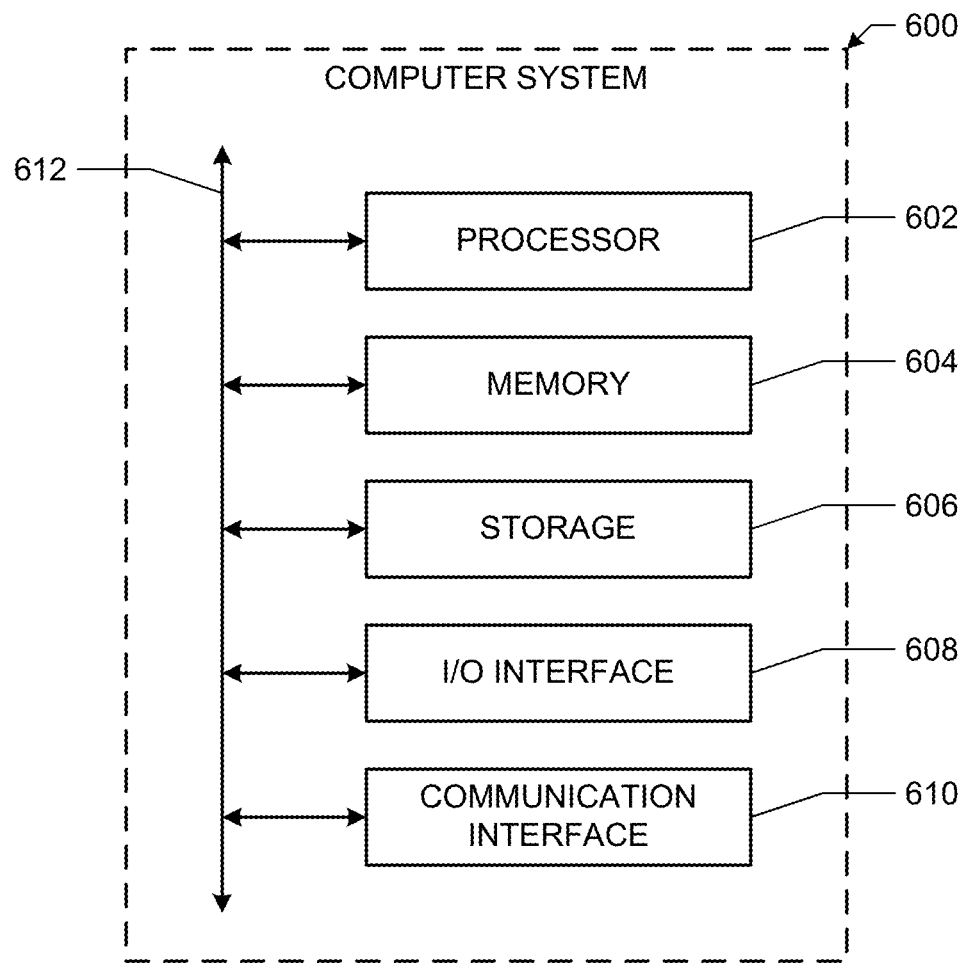
FIG. 5 illustrates an example computer system.

FIG. 5 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a desktop computer system, a mobile computer system, a game console, a mainframe, a mesh of computer systems, a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network (e.g., a 802.11a/b/g/n WI-FI network,), a WI-MAX network, a cellular telephone network (e.g., a Global System for Mobile Communications (GSM) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I$^2$C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 612 may include one or more buses 612, where appropriate.

Figure 6:
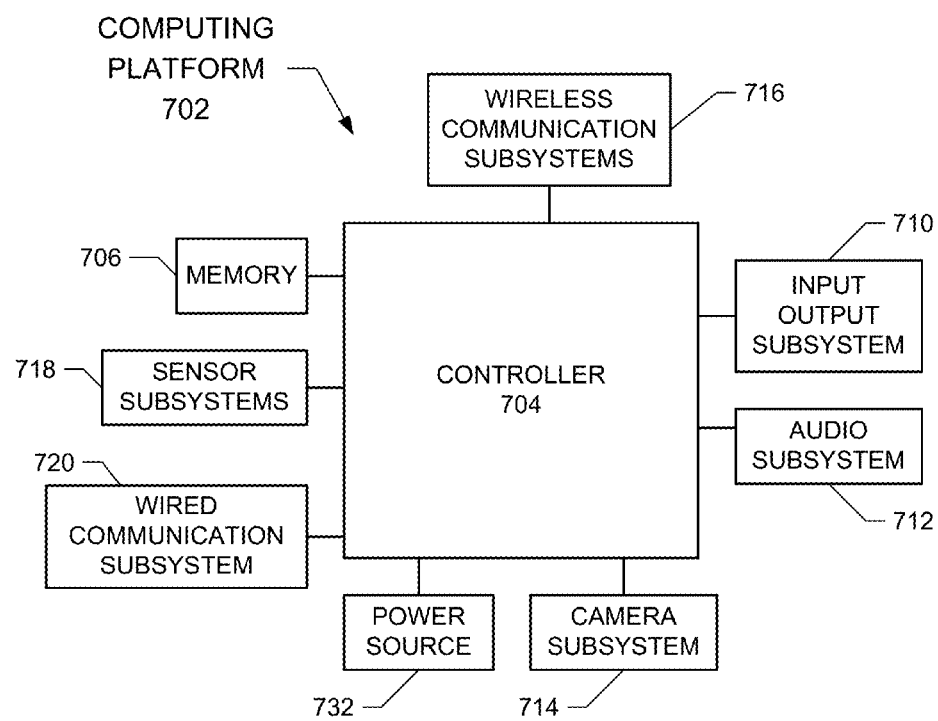
FIG. 6 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 6 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, and/or, display (e.g., liquid crystal display (LCD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (e.g., a BLUETOOTH), a WI-FI network (e.g., an 802.11a/b/g/n network), a WI-MAX network, a cellular telephone network (such as, for example, a Global System for Mobile Communications (GSM) network, a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I²C) bus, a Secure Digital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these. Additionally, computing platform 702 may be powered by power source 732.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, by one or more computing devices, comprising:
    upon creation of a shared space in a data store of shared spaces and prior to determining a current geographical location of a first user, transmitting a notification to the first user, one or more content objects being associated with a geographical location;
    receiving, from the first user, a request for the one or more content objects associated with the shared space identified in the notification;
    receiving the current geographical location of the first user;
    based on one or more read access controls with the shared spaces:
        allowing, the first user, read-access to the one or more content objects if the current geographical location of the first user is not within the threshold distance of the geographical location identified in the request; and
        allowing the first user write-access to the one or more content objects if the current geographical location of the first user is within the threshold distance of the geographical location identified in the request.

2. The method of claim 1, further comprising:
    in response to determining the current geographical location of the first user, accessing the data store of shared spaces;
    identifying one or more nearby shared spaces wherein each of the nearby shared spaces has a location within a threshold distance from the first user's current location;
    selecting at least one shared space from the one or more nearby shared spaces based on respective read-access controls associated with the one or more nearby shared spaces; and
    transmitting one or more content objects of the selected shared space to the first user.

3. The method of claim 2, wherein read-access controls associated with a nearby shared space comprise one or more privacy settings associated with the nearby shared space.

4. The method of claim 1, wherein the allowing the first user write-access to a shared space as long as the first user is within a threshold distance of the location associated with the shared space, further comprises:
    receiving, from the first user, a message comprising one or more new content objects;
    accessing data indicating a current location of the first user;
    determining the first user's write-accessibility to the shared space based at least in part on one or more write-access controls associated with the shared space and a determination whether the first user's current location is within the threshold distance of the location associated with the shared space; and
    updating the shared space stored in the data store of shared spaces with the one or more new content objects, if the first user has write-access to the shared space.

5. The method of claim 4, wherein the one or more write-access controls associated with the shared space comprise one or more privacy settings associated with the shared space.

6. A system comprising:
    a memory;
    one or more processors; and
    a non-transitory storage medium storing computer-readable instructions operative, when executed, to cause the one or more processors to:
        maintain upon creation of a shared space in a data store of shared spaces and prior to determining a current geographical location of a first user, transmitting a notification to the first user, one or more content objects being associated with a geographical location;

receive, from the first user, a request for the one or more content objects associated with the shared space identified in the notification;
receive the current geographical location of the first user;
based on one or more read access controls with the shared spaces:
allow, the first user, read-access to the one or more content objects if the current geographical location of the first user is not within the threshold distance of the geographical location identified in the request; and
allow the first user write-access to the one or more content objects if the current geographical location of the first user is within the threshold distance of the geographical location identified in the request.

7. The system of claim 6, further comprising instructions operable to cause the one or more processors to:
in response to determining the current geographical location of the first user, access the data store of shared spaces;
identify one or more nearby shared spaces wherein each of the nearby shared spaces has a location within a threshold distance from the first user's current location;
select at least one shared space from the one or more nearby shared spaces based on respective read-access controls associated with the one or more nearby shared spaces; and
transmit one or more content objects of the selected shared space to the first user.

8. The system of claim 7, wherein read-access controls associated with a nearby shared space comprise one or more privacy settings associated with the nearby shared space.

9. The system of claim 6, wherein to allow the first user write-access to a shared space as long as the first user is within a threshold distance of the location associated with the shared space, further comprises instructions operable to cause the one or more processors to:
receive, from the first user, a message comprising one or more new content objects;
access data indicating a current location of the first user;
determine the first user's write-accessibility to the shared space based at least in part on one or more write-access controls associated with the shared space and a determination whether the first user's current location is within the threshold distance of the location associated with the shared space; and
update the shared space stored in the data store of shared spaces with the one or more new content objects, if the first user has write-access to the shared space.

10. The system of claim 9, wherein the one or more write-access controls associated with the shared space comprise one or more privacy settings associated with the shared space.

11. One or more non-transitory computer-readable tangible storage media embodying software operable when executed by one or more computing devices to:
upon creation of a shared space in a data store of shared spaces and prior to determining a current geographical location of a first user, transmitting a notification to the first user, one or more content objects being associated with a geographical location;
receive, from the first user, a request for the one or more content objects associated with the shared space identified in the notification;
receive the current geographical location of the first user;
based on one or more read access controls with the shared space:
allow, the first user, read-access to the one or more content objects if the current geographical location of the first user is not within the threshold distance of the geographical location identified in the request; and
allow the first user write-access to the one or more content objects if the current geographical location of the first user is within the threshold distance of the geographical location identified in the request.

12. The non-transitory computer-readable tangible storage media of claim 11, further comprising software operable when executed by one or more computing devices to:
in response to determining the current geographical location of the first user, access the data store of shared spaces;
identify one or more nearby shared spaces wherein each of the nearby shared spaces has a location within a threshold distance from the first user's current location;
select at least one shared space from the one or more nearby shared spaces based on respective read-access controls associated with the one or more nearby shared spaces; and
transmit one or more content objects of the selected shared space to the first user.

13. The non-transitory computer-readable tangible storage media of claim 12, wherein read-access controls associated with a nearby shared space comprise one or more privacy settings associated with the nearby shared space.

14. The non-transitory computer-readable tangible storage media of claim 11, wherein to allow the first user write-access to a shared space as long as the first user is within a threshold distance of the location associated with the shared space, further comprises software operable when executed by one or more computing devices to:
receive, from the first user, a message comprising one or more new content objects;
access data indicating a current location of the first user;
determine the first user's write-accessibility to the shared space based at least in part on one or more write-access controls associated with the shared space and a determination whether the first user's current location is within the threshold distance of the location associated with the shared space; and
update the shared space stored in the data store of shared spaces with the one or more new content objects, if the first user has write-access to the shared space.

15. The non-transitory computer-readable tangible storage media of claim 14, wherein the one or more write-access controls associated with the shared space comprise one or more privacy settings associated with the shared space.

16. The method of claim 1, wherein:
transmitting the notification to the first user comprises presenting, prior to determining the current geographical location of the first user, a selectable link to the shared space in a newsfeed generated by a social networking system for the first user; and
receiving the request for the one or more content objects comprises receiving an indication that the first user selected the selectable link.

17. The method of claim 1, wherein:
transmitting the notification to the first user comprises posting, prior to determining the current geographical location of the first user, a selectable link to the shared space on a wall of a social networking system, the wall being associated with the first user; and receiving the request for the one or more content objects comprises receiving an indication that the first user selected the selectable link.

* * * * *